US012637336B2

(12) United States Patent　　　　(10) Patent No.: US 12,637,336 B2
Yu et al.　　　　　　　　　　　　　(45) Date of Patent: May 26, 2026

(54) APPARATUS AND METHOD FOR CONTROLLING VEHICLE WINCH, AND STORAGE MEDIUM

(71) Applicant: T-MAX (HANGZHOU) TECHNOLOGY CO., LTD., Hangzhou (CN)

(72) Inventors: Hangfei Yu, Hangzhou (CN); Shipei Yao, Hangzhou (CN); Haojia Chen, Hangzhou (CN); Haibin Chen, Hangzhou (CN)

(73) Assignee: T-MAX (HANGZHOU) TECHNOLOGY CO., LTD., Hangzhou (CN)

( * ) Notice: Subject to any disclaimer, the term of this patent is extended or adjusted under 35 U.S.C. 154(b) by 445 days.

(21) Appl. No.: 17/939,330

(22) Filed: Sep. 7, 2022

(65) Prior Publication Data

US 2023/0079253 A1　　Mar. 16, 2023

(30) Foreign Application Priority Data

Sep. 10, 2021　(CN) .......................... 202122199010.0

(51) Int. Cl.
B60R 16/00　　(2006.01)
B60R 16/03　　(2006.01)
B66D 1/48　　(2006.01)

(52) U.S. Cl.
CPC .............. B66D 1/485 (2013.01); B60R 16/03 (2013.01)

(58) Field of Classification Search
CPC .... B66D 1/04; B66D 1/56; B66D 1/58; B60R 16/03
See application file for complete search history.

(56) References Cited

U.S. PATENT DOCUMENTS

| | | | | |
|---|---|---|---|---|
| 5,648,887 | A * | 7/1997 | Herndon ................... | B66D 1/40 |
| | | | | 361/97 |
| 9,975,742 | B1 * | 5/2018 | Mason ...................... | B66D 1/46 |
| 10,526,178 | B2 * | 1/2020 | Huang ................... | B66D 1/485 |
| 2004/0065873 | A1 * | 4/2004 | Peterson ................ | B66D 1/485 |
| | | | | 254/276 |
| 2011/0271891 | A1 * | 11/2011 | Holmberg .............. | B66D 1/505 |
| | | | | 318/400.15 |
| 2016/0046468 | A1 * | 2/2016 | Heravi ..................... | B66D 1/54 |
| | | | | 715/835 |
| 2018/0175713 | A1 * | 6/2018 | Fretz ...................... | H02K 11/25 |
| 2020/0198561 | A1 * | 6/2020 | Weed .................... | B62D 63/04 |

* cited by examiner

*Primary Examiner* — Truc M Do
(74) *Attorney, Agent, or Firm* — David D. Brush; Westman, Champlin & Koehler, P.A.

(57) ABSTRACT

An apparatus and a method for controlling a vehicle winch, and a storage medium. The apparatus includes an instant control component and a delay control component. The instant control component is configured to start the winch and control a rotation direction of the winch. The delay control component is configured to acquire a running parameter of the winch and shut off the winch according to the running parameter.

14 Claims, 4 Drawing Sheets

```
                                                        ┌─ S1
┌──────────────────────────────────────────────┐
│ starting the winch and control a rotation       │
│ direction of the winch by an instant control    │
│ component                                       │
└──────────────────────────────────────────────┘
                      │                      ┌─ S2
                      ▼
┌──────────────────────────────────────────────┐
│ acquiring a running parameter of the winch and  │
│ shutting off the winch according to the running │
│ parameter by a delay control component          │
└──────────────────────────────────────────────┘
```

APPARATUS AND METHOD FOR CONTROLLING VEHICLE WINCH, AND STORAGE MEDIUM

CROSS REFERENCE TO RELATED APPLICATION

This application is based on and claims priority to Chinese patent application No. 202122199010.0, filed on Sep. 10, 2021, the content of which is incorporated herein by reference.

TECHNICAL FIELD

The disclosure relates to a field of vehicle control technologies, in particular to, an apparatus and a method for controlling a vehicle winch, and a storage medium.

BACKGROUND

A winch is a kind of rescue device that is widely applied in off-road vehicles, pickups and other vehicles. Timely and accurately starting and shutting off the winch may provide a guarantee for effectiveness and safety of a rescue process. In particular, in a case that the winch is not able to be shut off or even forgotten in an on state for a long time, it is possible to cause potential safety problems.

SUMMARY

Embodiments of the disclosure in a first aspect provide an apparatus for controlling a vehicle winch. The apparatus includes an instant control component and a delay control component. The instant control component is configured to start the winch and control a rotation direction of the winch. The delay control component is configured to acquire a running parameter of the winch and shut off the winch according to the running parameter.

Embodiments of the disclosure in a second aspect provide a method for controlling a vehicle winch. The method includes starting the winch and controlling a rotation direction of the winch by an instant control component; and acquiring a running parameter of the winch and shutting off the winch according to the running parameter by a delay control component.

Embodiments of the disclosure in a third aspect provide a non-transitory computer-readable storage medium. When a computer program stored in the storage medium is executed by a processor, a method for controlling a vehicle winch is implemented. The method comprises: starting the winch and controlling a rotation direction of the winch by an instant control component; and acquiring a running parameter of the winch and shutting off the winch according to the running parameter by a delay control component.

Figure 1:
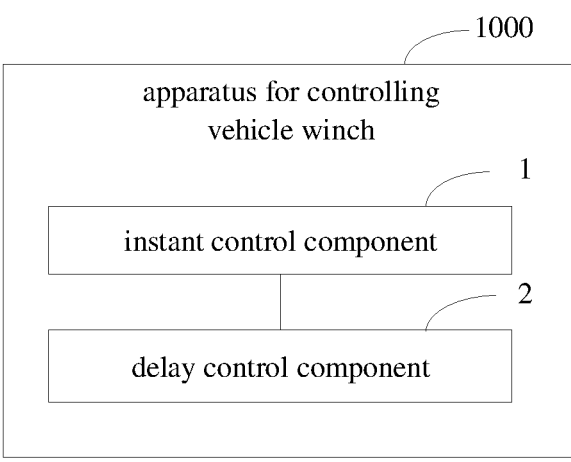
FIG. 1 is a block diagram illustrating an apparatus for controlling a vehicle winch according to an embodiment of the present disclosure.

1000—apparatus for controlling a vehicle winch: 1—instant control component: 2—delay control component: 10—first detector: 11—wireless controller: 20—delay switch: 21—second detector: 22—timer: 23—third detector: 24—fourth detector: 25—reminder component: 26—update element.

DETAILED DESCRIPTION

Reference will be made in detail to embodiments of the present disclosure. Examples of the embodiments of the present disclosure will be shown in drawings, in which the same or similar elements and the elements having same or similar functions are denoted by like reference numerals throughout the descriptions. The embodiments described herein according to drawings are illustrative, used to explain the present disclosure, not construed to limit the present disclosure.

Description will be made in detail below to an apparatus for controlling a vehicle winch provided according to embodiments of the present disclosure with reference to the drawings.

FIG. 1 is a schematic diagram illustrating an apparatus for controlling a vehicle winch according to an embodiment of the present disclosure.

As illustrated in FIG. 1, an apparatus 1000 for controlling a vehicle winch in an embodiment of the disclosure includes an instant control component 1 and a delay control component 2. The instant control component 1 is configured to start the winch and control a rotation direction of the winch. The delay control component 2 is configured to acquire a running parameter of the winch and shut off the winch according to the running parameter.

The vehicle winch (hereinafter referred to as winch) is a hoisting tool that completes traction by rotating a vertically set drum by human or mechanical power and horizontally winding a flexible component (e.g., a wire rope, or a chain, etc.). Types of the vehicle winch may include a manual winch and a motor winch.

For example, the motor winch may be widely applied in a variety of application scenarios. Taking an application scenario of road rescue as an example, the motor winch is configured to towing a vehicle to be rescued to move the vehicle to be rescued to a target area. In this case, when the winch is connected with the vehicle to be rescued, controlling the winch will affect a current state of the vehicle to be rescued.

Controlling the rotation direction of the winch refers to controlling the winch to operate in a target running direction. The target running direction may be clockwise or counterclockwise.

The running parameter of the winch may include at least one of a power-off duration of the winch, a present current of the winch, a present temperature of the winch, etc.

According to the apparatus 1000 for controlling the vehicle winch provided by the present disclosure, when attempting to start the winch to start the operation, the winch may be started via the instant control component 1 and controlled to operate in the target running direction. Further, when attempting to shut off the winch to stop the operation, the running parameter of the winch may be acquired via the delay control component 2, and the winch may be shut off with delay according to the running parameters.

Therefore, the apparatus provided by the present disclosure may ensure the winch to be accurately shut off with delay according to an instruction, which may not only prevent trouble of frequent startup caused by the automatic shutoff of the winch during usage, but also eliminate a complicated operation caused by the manual shutoff of the winch. Moreover, the automatic power-off function without operation may be realized through the delay control component, which may prevent the safety problems caused by the winch being powered on all the time, enhance safety, improve user experiences, and extend a service life of the winch.

Figure 2:
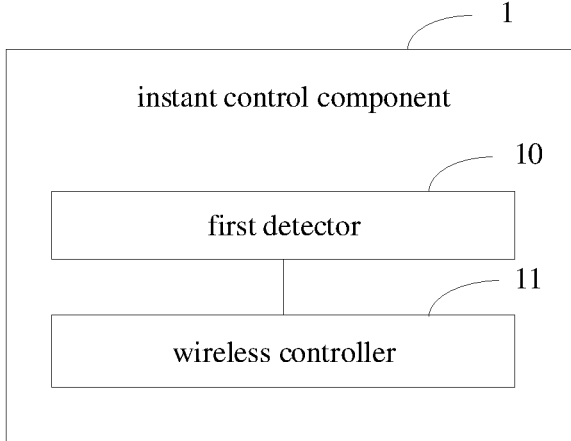
FIG. 2 is a block diagram illustrating an instant control component according to an embodiment of the present disclosure.

In some embodiments, as illustrated in FIG. 2, the instant control component 1 may include a first detector 10 and a wireless controller 11.

The first detector 10 is configured to detect a target operation for the winch, and after detecting the target operation, generate a starting request for the winch and send the starting request to the wireless controller 11.

It is noted that a specific setting with respect to the target operation for the winch is not limited and may be set according to an actual situation in the present disclosure.

Alternatively, an operation of clicking on a target area of a display interface by a user may be taken as the target operation for the winch. In this case, pressure on a target area of the display interface may be detected by an acquisition apparatus such as a pressure sensor, and it is determined that the target operation for the winch is detected in response to the detected pressure reaching a preset pressure threshold. Further, in response to detecting the target operation, the starting request for the winch is generated, and the starting request is transmitted to the wireless controller 11.

Alternatively, the user's operation on the physical key can be regarded as the target operation on the winch. In this case, the pressure on a target area on the physical key may be detected by an acquisition device such as a pressure sensor, and it is determined that the target operation for the winch is detected in response to the detected pressure reaching a preset pressure threshold. Further, in response to detecting the target operation, the starting request for the winch is generated, and the starting request is transmitted to the wireless controller 11.

Alternatively, an operation of a speech instruction issued by the user may be regarded as the target operation for the winch. In this case, after the user issues the speech instruction similar to that for opening the winch, in response to detecting the target operation, the starting request for the winch is generated, and the starting request is transmitted to the wireless controller 11.

It is noted that, taking the application scenario of the road rescue as an example, in a case that an accident site has situations such as a complicated terrain and a severe weather condition, it is likely that non-remotely controlling the winch will be difficult to implement. Therefore, in the present disclosure, the wireless controller 11 is adopted to generate the starting request for the winch and transmit the starting request to the wireless controller 11 after the first detector 10 detects the target operation, such that the wireless controller 11 may receive the starting request and remotely start the winch according to the starting request.

It is noted that the wireless controller may remotely control a start switch of a power supply of the winch through wireless communication with the winch and then start the winch.

Therefore, in the apparatus for controlling the vehicle winch proposed by the present disclosure, the target operation for the winch is detected through the first detector, and after detecting the target operation, the starting request for the winch is generated and the starting request is sent to the wireless controller, and then the wireless controller receives the starting request, and remotely starts the winch according to the starting request. Therefore, the apparatus may remotely start the winch according to an instant operation of the user, the user experience may be improved and a feasibility of controlling winch to operate may be ensured.

Figure 3:
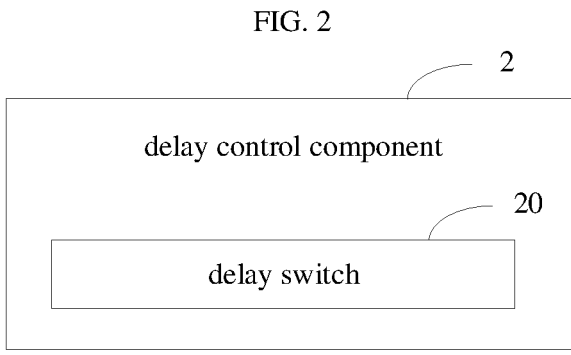
FIG. 3 is a block diagram illustrating a delay control component according to an embodiment of the present disclosure.

In some embodiments, as illustrated in FIG. 3, the delay control component 2 may include a delay switch 20. The delay switch 20 is configured to receive a shutoff request and shut off the winch according to the shutoff request.

It is noted that in the present disclosure, generating the shutoff request according to the obtained operation parameter of the winch may be implemented in a variety of ways. Alternatively, the shutoff request may be generated in response to the present power-off duration of the winch exceeding a preset duration threshold. Alternatively, the shutoff request may be generated in response to the preset current of the winch exceeding a preset current threshold. Alternatively, the shutoff request may be generated in response to the preset temperature of the winch exceeding a preset temperature threshold.

Explanation of the process of generating the shutoff request below with respect to the present power-off duration of the winch, the present current of the winch, and the present temperature of the winch, respectively, may be made below.

Figure 4:
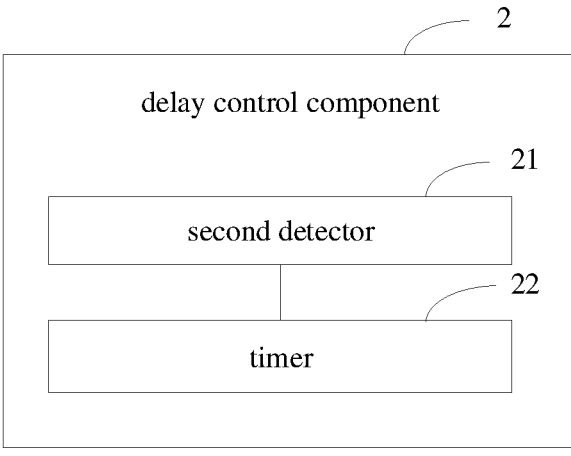
FIG. 4 is a block diagram illustrating a delay control component according to another embodiment of the present disclosure.

In some embodiments, as illustrated in FIG. 4, the delay control component 2 may further include a second detector 21 and a timer 22.

The second detector 21 is configured to detect whether the winch is powered on and send a timing request to the timer in response to recognizing that the winch is in a power-off state.

It is noted that when detecting that the winch is in a power-off state, the second detector 21 may send the timing request to the timer and determine whether the winch is to be shut off.

The timer 22 is configured to receive the timing request, acquire the power-off duration of the winch according to the timing request to determine whether the power-off duration exceeds a preset duration threshold, and in response to the power-off duration exceeding the preset duration threshold, generate the shutoff request for the winch and send the shutoff request to the delay switch.

It is noted that the preset duration threshold may be preset in the present disclosure. For example, the preset duration threshold may be preset according to an actual situation, such as set as 20 s, or set as 15 s.

For example, in a case that the preset duration threshold is 20 s, in response to the power-off duration acquired by the timer being 10 s, the power-off duration does not exceed the preset duration threshold, then no shutoff request for the winch is generated.

For example, in a case that the preset duration threshold is 20 s, in response to the power-off duration acquired by the timer being 25 s, the power-off duration exceeds the preset duration threshold, the shutoff request for the winch is generated and the shutoff request is sent to the delay switch 20.

Figure 5:
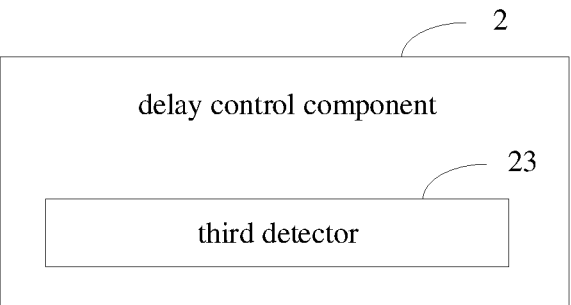
FIG. 5 is a block diagram illustrating a delay control component according to yet another embodiment of the present disclosure.

In some embodiments, as illustrated in FIG. 5, the delay control component 2 further includes a third detector 23. The third detector 23 is configured to acquire the present current of the winch to determine whether the present current exceeds a preset current threshold, and in response to the present current exceeding a preset current threshold, generate the shutoff request for the winch and send the shutoff request to the delay switch 20.

It is noted that the preset current threshold may be preset in the present disclosure. For example, the preset current threshold may be preset according to an actual situation, such as set as 10A, or set as 15A.

For example, in a case that the preset current threshold is 10 A, in response to the present current of the winch detected by the third detector 23 being 12 A, the present current of the winch exceeds the preset current threshold, and the shutoff request for the winch is generated and the shutoff request is sent to the delay switch 20.

For example, in a case that the preset current threshold is 10 A, in response to the present current of the winch detected by the third detector 23 being 5 A, the present current of the winch does not exceed the preset current threshold, and no shutoff request for the winch is generated.

Figure 6:
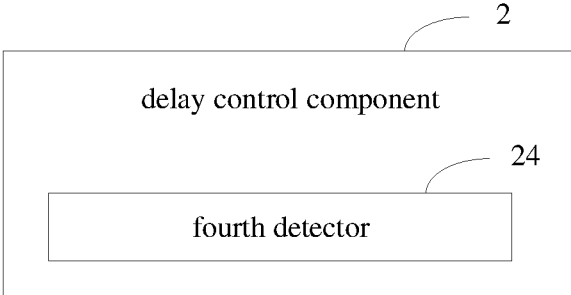
FIG. 6 is a block diagram illustrating a delay control component according to still another embodiment of the present disclosure.

In some embodiments, as illustrated in FIG. 6, the delay control component 2 further includes a fourth detector 24. The fourth detector 24 is configured to acquire the present temperature of the winch to determine whether the present temperature exceeds a preset temperature threshold, and in response to the current temperature exceeding the preset temperature threshold, generate the shutoff request for the winch and send the shutting off to the delay switch 20.

It is noted that the preset temperature threshold may be preset in the present disclosure. For example, the preset temperature threshold may be preset according to an actual situation, such as set as 40° C., or set as 50° C.

For example, in a case that the preset temperature threshold is 40° C., in response to the present temperature of the winch detected by the fourth detector 24 being 45° C., the present temperature of the winch exceeds the preset temperature threshold, and the shutoff request for the winch is generated and the shutoff request is sent to the delay switch 20.

For example, in a case that the preset temperature threshold is 40° C., in response to the present temperature of the winch detected by the fourth detector 24 being 35° C., the present temperature of the winch does not exceed the preset current threshold, and no shutoff request for the winch is generated.

To sum up, the present power-off duration of the winch, the present current of the winch, or the present temperature of the winch may be used as a basis for determining whether to generate the shutoff request. However, since the power-off duration of the winch, the present current of the winch, and the present temperature of the winch may fluctuate, in order to generate the shutoff request more accurately, danger levels may be preset, and at least two running parameters may be identified in combination according to the danger levels, such that an identification result may be used as the basis for determining whether to generate the shutoff request. The danger levels may be set according to an actual situation, for example, the danger levels may be set as a primary level, a medium level, a high level, etc.

For example, when the detected current of the winch is at the medium level, it may further determine whether the present temperature of the winch exceeds the threshold, and in response to the temperature exceeding the preset temperature threshold, the shutoff request for the winch is generated, and the shutoff request is sent to the delay switch 20.

Figure 7:
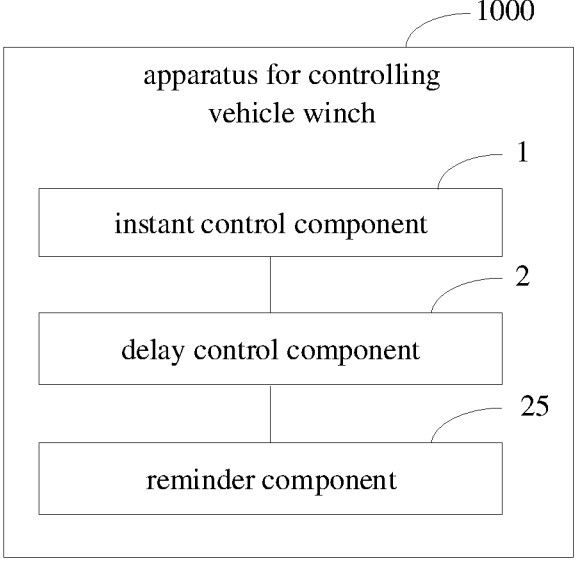
FIG. 7 is a block diagram illustrating an apparatus for controlling a vehicle winch according to another embodiment of the present disclosure.

In some embodiments, as illustrated in FIG. 7, the apparatus 1000 further includes a reminder component 25. The reminder component 25 is configured to generate a safety reminder and send the safety reminder to a user equipment in response to the present current exceeding the preset current threshold and/or the present temperature exceeding the preset temperature threshold.

It is noted that the safety reminder matches the preset temperature threshold, and the preset current threshold is preset in the present disclosure. Alternatively, after acquiring the present current of the winch, the safety reminder may be generated and sent to the user equipment in response to the present current exceeding the preset current threshold. Alternatively, after acquiring the present temperature of the winch, the safety reminder may be generated and sent to the user equipment in response to the present temperature exceeding the preset temperature threshold. Alternatively, after acquiring the present current and the present temperature of the winch, the safety reminder may be generated and sent to the user equipment in response to the present current exceeding the preset current threshold and the present temperature exceeding the preset temperature threshold.

For example, the safety reminder may include, but not limited to, a SMS reminder, a telephone reminder, etc.

The user equipment may include, but not limited to, a mobile phone, a computer, etc.

For example, when the acquired present temperature of the winch is 45° C. and the preset temperature threshold is 40° C., the present temperature of the winch exceeds the preset temperature threshold, the reminder component may generate the safety reminder and send information such as the present temperature of the winch exceeding the preset temperature threshold to the mobile phone of the user, such that the user may understand the running parameter of the winch at any time.

Figure 8:
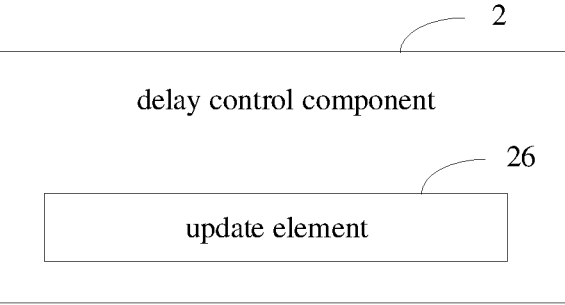
FIG. 8 is a block diagram illustrating a delay control component according to still another embodiment of the present disclosure.

In some embodiments, as illustrated in FIG. 8, the delay control component 2 further comprises an update element 26. The update element 26 is configured to receive an update request for the preset duration threshold and update the preset duration threshold according to the update request.

It should be noted that the preset duration threshold may be preset in the present disclosure. After the winch is powered on and started, the preset duration threshold may be used as a default threshold to identify the power-off duration of the winch. The preset duration threshold may be set according to an actual situation. For example, the preset duration threshold may be set as 15 s, and for example, the preset duration threshold may be set as 30 s.

In the present disclosure, after the update element 26 receives the update request for the preset duration threshold, the updated power-off duration threshold may be extracted from the update request.

For example, when the preset power-off duration is 15 s, and the updated duration threshold extracted from the update request is 20 s, in this case, the preset duration threshold may be updated as 20 s.

Therefore, the apparatus for controlling the vehicle winch provided by the present disclosure may generate the shutoff request for the winch to send to the delay switch in response to at least of the present power-off duration of the winch exceeding the preset duration threshold, the present current of the winch exceeding the preset current threshold and the present temperature of the winch exceeding the preset temperature threshold. The safety reminder may be generated and sent to the user equipment in response to at least one of the present current exceeding the preset current threshold and the present temperature exceeding the preset temperature threshold. The preset duration threshold may also be updated. Therefore, the apparatus may shut off the winch timely according to a change of the operation parameter of the winch, which may improve safety during the running process of the winch, and may also prevent the winch from being in the power-on state all the time, and prolong the service life of electronic elements.

In some embodiments, the first detector 20 is further configured to re-detect the target operation for the winch and determine whether the winch is in a power-off state in response detecting the target operation, and in response to the winch being in the power-off state, generate the starting request and send the starting request to the wireless controller 11.

It is noted that, after detecting the target operation, the first detector 10 may determine whether the winch is in the shutoff state, and when the winch is in the shutoff state, generate the starting request and send the starting request to the wireless controller 11.

It is noted that, after detecting the target operation, the first detector 10 may determine whether the winch is in the starting state, and when the winch is in the starting state, feedback information that the winch is in the starting state to the user equipment, to remind the user that the winch is presently in the starting state and cannot be started again and can be shut off first and then started again when the winch is to be started.

For example, when the winch is in the starting state, a text reminder or a speech reminder may be sent to the user equipment through the reminder component 25 to remind the user that the winch is presently in the starting state and cannot be opened again and can be shut off first and then started again when the winch is to be started.

In some embodiments, the wireless controller 11 is further configured to acquire a preset running direction of the winch and remotely control the winch according to the preset running direction.

It should be noted that the preset operation direction of the winch is not limited in the present disclosure. The preset operation direction of the winch may be acquired according to the actual situation.

Alternatively, in a case that the preset operation direction is carried in the starting request, the preset operation direction of the winch may be acquired directly according to the starting request.

For example, in a cast that the user inputs that the preset operation direction is set as clockwise when inputting the starting request via the display interface, the preset operation direction of the winch may be directly acquired as clockwise according to the starting request.

Alternatively, in a case that the preset operation direction is not carried in the starting request, but is carried in a setting request for the preset operation direction, the setting request for the preset operation direction may be acquired, and the preset direction of the winch may be acquired according to the setting request.

For example, after the user inputs the starting request on a first display interface, it is jumped to a second display interface, and a setting of the operation direction is input via the second display interface to generate the setting request for the preset operation direction. Alternatively, in a case that the user sets the preset operation direction as clockwise, the preset operation direction of the winch may be acquired as clockwise according to the setting request for the preset operation direction.

It should be noted that before attempting to remotely control the winch, it is required to determine whether the winch is in the starting state. Alternatively, in a case that the winch is not in the starting state, the winch is controlled according to the preset direction after the starting request is acquired. Alternatively, in a case that the winch is in the starting state, the winch may be directly controlled to run clockwise according to the preset direction of the previous running cycle.

Further, after determining that the winch is in the starting state, it may first determine whether the present operation direction of the winch is the preset operation direction. Alternatively, in a case that the present operation direction is consistent with the preset operation direction, there is no need to change the operation direction of the winch. Alternatively, in a case that the present operation direction of the winch is not the preset operation direction, the present operation direction of the winch may be adjusted to the preset operation direction.

For ease of understanding, the operating principle of the apparatus for controlling the vehicle winch provided in embodiments of the present disclosure will be explained below.

The apparatus 1000 for controlling the vehicle winch may include an instant control component 1 and a delay control component 2.

When the user desires to start the winch, a corresponding operation (target operation) may be performed. Accordingly, the first detector 10 may detect the target operation, and then generate the starting request in response to detecting the target operation and send the starting request to the wireless controller 11. The wireless controller 11 may remotely start the winch after receiving the starting request.

After the user performs the target operation again, the first detector 10 may also re-detect the target operation for the winch. When the winch is in the shutoff state, the first detector 10 may generate the starting request and send the starting request to the wireless controller 11. After the wireless controller 11 obtains the preset operation direction of the winch, the winch may be remotely controlled again according to the preset operation direction.

Figure 9:
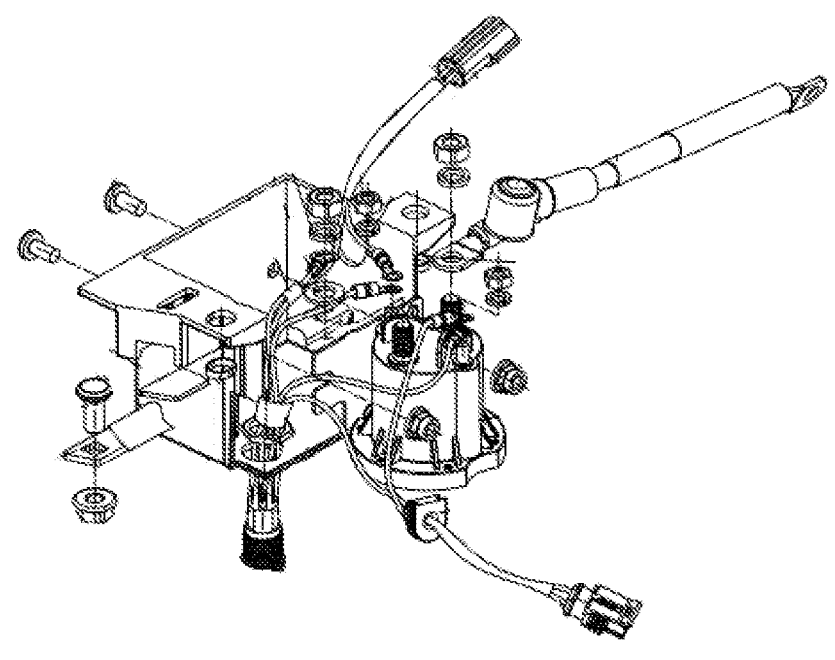
FIG. 9 is a schematic diagram illustrating a delay switch according to still an embodiment of the present disclosure.

After the user starts the winch, it is unnecessary to further control the winch. The winch may be automatically shut off by obtaining various running parameters of the winch. For example, when detecting that the running parameters of the winch meet a condition for generating the shutoff request, the shutoff request may be generated and sent to the delay switch 20 shown in FIG. 9. The delay switch 20 may receive the shutoff request and close the winch according to the shutoff request.

The present power-off duration of the winch, the present current of the winch, the present temperature of the winch and other running parameters may be used as the basis for determining whether to generate the shutoff request.

Regarding the present power-off duration of the winch as the basis for determining whether to generate the shutoff request, when recognizing that the winch is in the power-off state, the second detector 21 may send a request to the timer 22, and the timer 22 may receive the timing request to start timing, such that in response to the power-off duration exceeding the preset duration threshold, the shutoff request for the winch is generated and sent to the delay switch 20 to delay and automatically shut off the winch.

Regarding the present current of the winch as the basis for determining whether to generate the shutoff request, when the third detector 23 acquires the present current of the winch, in response to the present current of the winch exceeding the preset current threshold, the shutoff request for the winch is generated and sent to the delay switch 20 to delay and automatically shut off the winch.

Regarding the present temperature of the winch as the basis for determining whether to generate the shutoff request, when the fourth detector 24 acquires the present temperature of the winch, in response to the present temperature of the winch exceeding the preset temperature threshold, the shutoff request for the winch is generated and sent to the delay switch 20 to delay and automatically shut off the winch.

Further, in response to at least one of the present current of the winch exceeding the preset current threshold and the present temperature of the winch exceeding the preset temperature threshold, the reminder component 25 in the apparatus 1000 for controlling the vehicle winch generates the safety reminder and sends the safety reminder to the user equipment such that the user may understand the change of the winch operation parameter.

In addition, when the user attempts to change the duration threshold, the corresponding operation may be performed. Accordingly, the update element 26 in the delay component 2 may receive the update request for the preset duration threshold and update the preset duration threshold according to the update request.

To sum up, the apparatus for controlling the vehicle winch provided in this embodiment may remotely start the winch according to the operation of the user, the user experience may be improved, and the winch may be accurately shut off with delay according to different the running parameters, and the running parameters may timely sent to the user equipment, which may enhances the safety during the running process of the winch, extend the service life of the winch, and eliminate the complicated operation caused by the manual shutoff of the winch. Further, the apparatus may remotely start the winch according to the instant operation of the user, which may improve the user experience and ensure the feasibility of controlling the winch to operate. In addition, the apparatus may timely shut off the winch according to the change of the winch running parameter, which may improve the safety during the operation process of the winch.

The present disclosure provides a method for controlling a vehicle winch.

Figure 10:
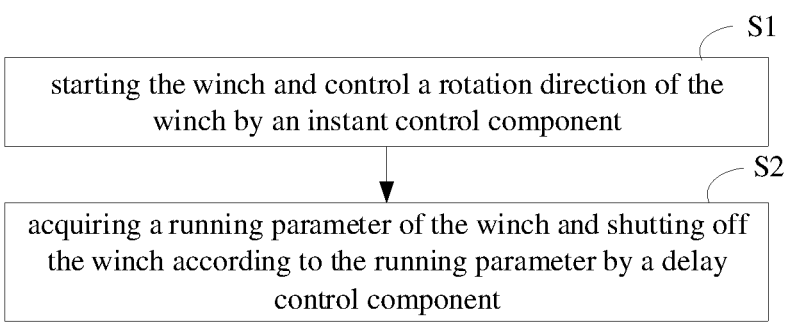
FIG. 10 is a flowchart illustrating a method for controlling a vehicle winch according to an embodiment of the present disclosure.

FIG. 10 is a flowchart illustrating a method for controlling a vehicle winch according to an embodiment of the present disclosure.

As illustrated in FIG. 10, the method for controlling the vehicle winch may include the following blocks.

At block S1, an instant control component starts the winch and controls a rotation direction of the winch.

At block S2, a delay control component acquires a running parameter of the winch and shuts off the winch according to the running parameter.

In some embodiments, starting the winch includes:

detecting a target operation for the winch, and after detecting the target operation, and generating a starting request for the winch; and remotely starting the winch according to the starting request.

In some embodiments, shutting off the winch includes:

receiving a shutoff request and shutting off the winch according to the shutoff request by a delay switch.

In some embodiments, the running parameter is a power-off duration of the winch, and receiving the shutoff request and shutting off the winch according to the shutoff request by the delay switch includes:

detecting whether the winch is powered on, and performing timing in response to recognizing that the winch is in a power-off state:

acquiring the power-off duration of the winch to determine whether the power-off duration exceeds a preset duration threshold; and in response to the power-off duration exceeding the preset duration threshold, generating the shutoff request for the winch and sending the shutoff request to the delay switch.

In some embodiments, the running parameter is a present current of the winch, and receiving the shutoff request and shutting off the winch according to the shutoff request by the delay switch includes:

acquiring the present current of the winch to determine whether the present current exceeds a preset current threshold; and in response to the present current exceeding a preset current threshold, generating the shutoff request for the winch and sending the shutoff request to the delay switch.

In some embodiments, the running parameter is a present temperature of the winch, and receiving the shutoff request and shutting off the winch according to the shutoff request by the delay switch includes:

acquiring the present temperature of the winch to determine whether the present temperature exceeds a preset temperature threshold; and in response to the current temperature exceeding the preset temperature threshold, generating the shutoff request for the winch and sending the shutting off to the delay switch.

In some embodiments, the method further includes:

generating a safety reminder and sending the safety reminder to a user equipment in response to the present current exceeding the preset current threshold and/or the present temperature exceeding the preset temperature threshold.

In some embodiments, the method further includes:

receiving an update request for the preset duration threshold and updating the preset duration threshold according to the update request.

In some embodiments, the method further includes:

re-detecting the target operation for the winch and determining whether the winch is in a power-off state in response detecting the target operation; and in response to the winch being in the power-off state, generating the starting request and sending the starting request to the wireless controller.

In some embodiments, the method further includes:

acquiring a preset running direction of the winch and remotely controlling the winch according to the preset running direction.

The present disclosure provides a non-transitory computer-readable storage medium. When a computer program stored in the storage medium is executed by a processor, a method for controlling a vehicle winch is implemented. The method may include starting the winch and controlling a rotation direction of the winch by an instant control component; and acquiring a running parameter of the winch and shutting off the winch according to the running parameter by a delay control component.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," "counterclockwise," "axial," and "radial," "circumferential," should be construed to refer to the orientation as then described or as shown in the drawings under discussion. These relative terms are for convenience of description and do not require that the present invention be constructed or operated in a particular orientation.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

In the present invention, unless specified or limited otherwise, the terms "mounted," "connected," "coupled," "fixed" and the like are used broadly, and may be, for example, fixed connections, detachable connections, or integral connections: may also be mechanical or electrical connections: may also be direct connections or indirect connections via intervening structures: may also be inner communications of two elements, which can be understood by those skilled in the art according to specific situations.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. An apparatus for controlling a vehicle winch, comprising an instant control component and a delay control component, wherein, the instant control component is configured to start the winch and control a rotation direction of the winch; and the delay control component is configured to acquire a running parameter of the winch and shut off the winch according to the running parameter;

wherein the instant control component comprises a first detector and a wireless controller; wherein, the first detector is configured to detect a target operation for the winch, and after detecting the target operation, generate a starting request for the winch and send the starting request to the wireless controller, wherein the target operation for the winch is an operation of a speech instruction issued by a user; and the wireless controller is configured to receive the starting request and remotely start the winch according to the starting request;

wherein the delay control component comprises a delay switch, configured to receive a shutoff request and shut off the winch according to the shutoff request;

wherein the running parameter comprises: a power-off duration of the winch, a present current of the winch, or a present temperature of the winch;

wherein shut off the winch according to the running parameter further comprises: presetting danger levels, at least two running parameters being identified in combination according to the danger levels, and determining whether to generate the shutoff request based on an identification result;

wherein the running parameter is a power-off duration of the winch, and the delay control component further comprises a second detector and a timer;

wherein the second detector is configured to detect whether the winch is powered on, and send a timing request to the timer in response to recognizing that the winch is in a power-off state; and wherein the timer is configured to receive the timing request, acquire the power-off duration of the winch according to the timing request to determine whether the power-off duration exceeds a preset duration threshold, and in response to the power-off duration exceeding the preset duration threshold, generate the shutoff request for the winch and send the shutoff request to the delay switch.

2. The apparatus according to claim 1, wherein the running parameter is a present current of the winch, and the delay control component further comprises a third detector; wherein, the third detector is configured to acquire the present current of the winch to determine whether the present current exceeds a preset current threshold, and in response to the present current exceeding a preset current threshold, generate the shutoff request for the winch and send the shutoff request to the delay switch.

3. The apparatus according to claim 1, wherein the running parameter is a present temperature of the winch, and the delay control component further comprises a fourth detector; wherein, the fourth detector is configured to acquire the present temperature of the winch to determine whether the present temperature exceeds a preset temperature threshold, and in response to the current temperature exceeding the preset temperature threshold, generate the shutoff request for the winch and send the shutting off to the delay switch.

4. The apparatus according to claim 2, further comprising a reminder component, configured to:

generate a safety reminder and send the safety reminder to a user equipment in response to the present current exceeding the preset current threshold and/or the present temperature exceeding the preset temperature threshold.

5. The apparatus according to claim 3, further comprising a reminder component, configured to:

generate a safety reminder and send the safety reminder to a user equipment in response to the present current exceeding the preset current threshold and/or the present temperature exceeding the preset temperature threshold.

6. The apparatus according to claim 1, wherein the wireless controller is further configured to:

acquire a preset running direction of the winch, and remotely control the winch according to the preset running direction.

7. A method for controlling a vehicle winch, comprising:

starting the winch and controlling a rotation direction of the winch by an instant control component; and acquiring a running parameter of the winch and shutting off the winch according to the running parameter by a delay control component;

wherein starting the winch comprises:

detecting a target operation for the winch, and after detecting the target operation, and generating a starting request for the winch, wherein the target operation for the winch is an operation of a speech instruction issued by a user; and remotely starting the winch according to the starting request;

wherein shutting off the winch comprises:

receiving a shutoff request and shutting off the winch according to the shutoff request by a delay switch;

wherein the running parameter comprises: a power-off duration of the winch, a present current of the winch, or a present temperature of the winch;

wherein shut off the winch according to the running parameter further comprises: presetting danger levels, at least two running parameters being identified in combination according to the danger levels, and determining whether to generate the shutoff request based on an identification result;

wherein the running parameter is a power-off duration of the winch, and receiving the shutoff request and shutting off the winch according to the shutoff request by the delay switch comprises:

detecting whether the winch is powered on, and performing timing in response to recognizing that the winch is in a power-off state;

acquiring the power-off duration of the winch to determine whether the power-off duration exceeds a preset duration threshold; and in response to the power-off duration exceeding the preset duration threshold, generating the shutoff request for the winch and sending the shutoff request to the delay switch.

8. The method according to claim 7, wherein the running parameter is a present current of the winch, and receiving the shutoff request and shutting off the winch according to the shutoff request by the delay switch comprises:

acquiring the present current of the winch to determine whether the present current exceeds a preset current threshold; and in response to the present current exceeding a preset current threshold, generating the shutoff request for the winch and sending the shutoff request to the delay switch.

9. The method according to claim 7, wherein the running parameter is a present temperature of the winch, and receiving the shutoff request and shutting off the winch according to the shutoff request by the delay switch comprises:

acquiring the present temperature of the winch to determine whether the present temperature exceeds a preset temperature threshold; and in response to the current temperature exceeding the preset temperature threshold, generating the shutoff request for the winch and sending the shutting off to the delay switch.

10. The method according to claim 7, further comprising:

acquiring a preset running direction of the winch, and remotely controlling the winch according to the preset running direction.

11. A non-transitory computer-readable storage medium, wherein when a computer program stored in the storage medium is executed by a processor, a method for controlling a vehicle winch is implemented, and the method comprises:

starting the winch and controlling a rotation direction of the winch by an instant control component; and acquiring a running parameter of the winch and shutting off the winch according to the running parameter by a delay control component;

wherein starting the winch comprises:

detecting a target operation for the winch, and after detecting the target operation, and generating a starting request for the winch, wherein the target operation for the winch is an operation of a speech instruction issued by a user; and remotely starting the winch according to the starting request;

wherein shutting off the winch comprises:

receiving a shutoff request and shutting off the winch according to the shutoff request by a delay switch;

wherein the running parameter comprises: a power-off duration of the winch, a present current of the winch, or a present temperature of the winch;

wherein shut off the winch according to the running parameter further comprises: presetting danger levels, at least two running parameters being identified in combination according to the danger levels, and determining whether to generate the shutoff request based on an identification result;

wherein the running parameter is a power-off duration of the winch, and receiving the shutoff request and shutting off the winch according to the shutoff request by the delay switch comprises:

detecting whether the winch is powered on, and performing timing in response to recognizing that the winch is in a power-off state;

acquiring the power-off duration of the winch to determine whether the power-off duration exceeds a preset duration threshold; and in response to the power-off duration exceeding the preset duration threshold, generating the shutoff request for the winch and sending the shutoff request to the delay switch.

12. The apparatus according to claim 1, wherein the delay control component further comprises an update element, configured to receive an update request for the preset duration threshold and update the preset duration threshold according to the update request.

13. The apparatus according to claim 1, wherein the first detector is further configured to:

re-detect the target operation for the winch and determine whether the winch is in a shut-off state in response detecting the target operation; and in response to the winch being in the shut-off state, generate the starting request and send the starting request to the wireless controller.

14. The method according to claim 7, further comprising:

re-detecting the target operation for the winch and determining whether the winch is in a shut-off state in response detecting the target operation; and in response to the winch being in the shut-off state, generating the starting request and sending the starting request to the wireless controller.

\* \* \* \* \*